United States Patent Office
3,565,739
Patented Feb. 23, 1971

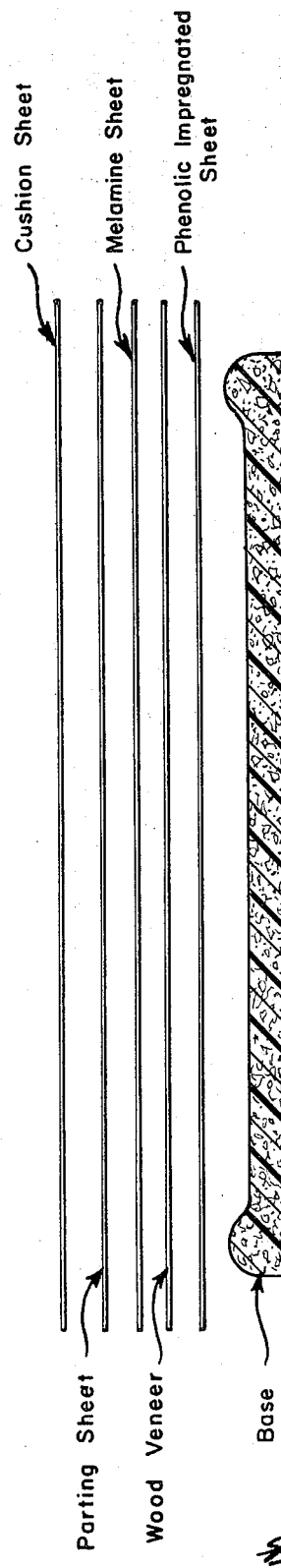
INVENTORS
Joseph Ianuzzi &
Robert P. Habgood, Jr.

3,565,739
COMPOSITE WOOD ARTICLES AND METHODS
OF MAKING THE SAME
Joseph Ianuzzi and Robert P. Habgood, Bradford, Pa.,
assignors to Plexwood, Inc.
Filed Feb. 21, 1967, Ser. No. 617,473
Int. Cl. B32b 21/14
U.S. Cl. 161—43                                           4 Claims

ABSTRACT OF THE DISCLOSURE

A compound curved wood veneer surfaced article and method of manufacturing the same. The article having a core of heat and pressure formed wood chips and resin encased within a phenolic resin envelope bonded to a sheet of wood veneer coated and impregnated with a member from the group consisting of melamine and modified melamine resins. The method including the steps of forming a core of wood chips and resin, assembling the core in a mold with a sheet of phenolic core stock on each side, a sheet of wood veneer, a sheet of melamine type resin and compressing the assembly at 240°–350° F., under 1000–6000 p.s.i.

---

This invention relates to composite wood articles and methods of making such articles and particularly to a formed article of wood chips having curved surfaces and an outer, press finished wood veneer surface.

Articles having curved surfaces made of wood chips have many advantages over articles made of natural wood, such as shape stability, controlled density and reduced cost. However, one disadvantage common to all curved, three dimensional wood chip articles in the past is that the outer surface could not be of press finished wood veneer but had to be formed of a synthetic resin impregnated paper printed to simulate wood. All efforts to use in-press finished wood veneers as the surfacing film for such articles have proven unsatisfactory because of discoloration or failure to properly bond the several components.

We have discovered an article and method of manufacturing in-press finished wood veneer surfaced wood chip articles which eliminates these problems and provides a completely bonded veneer surface free from the discoloration and whiteness or haze which characterized previous attempts to fabricate such articles.

Preferably we form a wood chip core of the approximate size and shape of the finished article from a mixture of wood chips and resin in the usual manner. One or more layers of resin impregnated paper are placed on the core, followed by a sheet of the desired wood veneer having a thickness between about $\frac{1}{60}$ and $\frac{1}{120}$ inch in thickness, a sheet of Starlon or modified melamine sheet resin, a parting paper and a cushion sheet. This assembly is then press formed at pressures of 500 to 6000 p.s.i. and temperatures of 280° F. to 350° F. Preferably we use pressures in the narrower range of 1000 to 2000 p.s.i. and temperatures between about 290° F. and 330° F. Preferably we use natural wood, however, we have found that stained veneers may also be used. Such stained veneers may be stained with either oil or water stain. Preferably we use a silicon impregnated sheet as the parting paper and a sheet of kraft paper as a cushion sheet.

In the foregoing general description we have set out certain objects, advantages and purposes of our invention. Other objects, purposes and advantages of our invention will be apparent from a consideration of the following description of examples of the practice of our invention.

EXAMPLE I

A core for a table top, 30 inches square having a rolled edge was formed of hardwood chips and resin as described in our application Ser. No. 618,701 filed herewith. The core was placed in a heated finish mold and overlaid on both top and bottom with a sheet of phenolic core stock, a sheet of walnut veneer $\frac{1}{60}$ inch thick was placed on the core stock on top of the table top core and the veneer overlaid with a sheet of Starlon resin (a melamine related resin manufactured by Fabricon, Inc.). Parting paper and kraft paper were overlaid on the top and the mold closed. The assembly was placed under 1500 p.s.i. pressure at a temperature of 310° F. for 5 minutes. The pressure was released and the table top removed. The finished top had a clear translucent finish free of blemishes and whiteness and without any breaking or tearing of the veneer at the point of direction change where the curved surfaces are formed.

EXAMPLE II

The identical practice described in Example I was followed but a maple veneer sheet $\frac{1}{80}$ inch thick was substituted for the walnut veneer. The resulting table top had a smooth hard outer surface free from blemishes, faults or discoloration.

EXAMPLE III

A $\frac{1}{100}$ inch birch veneer stained with a water base walnut stain was substituted for the walnut veneer of Example I with like satisfactory results.

EXAMPLE IV

The practice described in Example I was repeated using a $\frac{1}{120}$ inch veneer sheet of walnut and two phenolic core stock sheets between the veneer and the wood chip core. The results were equally as satisfactory.

EXAMPLE V

The identical assembly of core and veneer used in Example IV was pressed under a pressure of 2500 p.s.i. with equally satisfactory results.

It is essential that the veneer be sufficiently thin that there be substantially no measurable compression under the pressures used. We have found this to be between about $\frac{1}{60}$ inch and $\frac{1}{120}$ inch as described hereinabove. It is also important that there be substantial penetration of the outer finish sheet of Starlon or modified melamine resin penetrated through the veneer to the core stock.

The typical assembly of a composite compound curved wood veneer article is shown in the exploded form in the attached drawing.

While we have illustrated and described certain preferred practices and embodiments of our invention in the foregoing specification, it will be understood that the invention may be otherwise embodied within the scope of the following claims.

We claim:
1. A composite compound curved wood veneer surfaced article comprising a core of heat and pressure formed wood chips and resin encased within a phenolic resin envelope bonded thereto and a sheet of wood veneer between $\frac{1}{60}$ and $\frac{1}{120}$ inch in thickness covering the compound curved surfce, said veneer being coated and impregnated with a member from the group consisting of melamine, melamine related and modified melamine resins and bonded to the phenolic resin by said impregnating resin under pressure and elevated temperature.

2. The method of forming a composite compound curved wood veneer surfaced article comprising the steps of:
  (a) forming a wood chip and resin core having a compound curved surface under pressure and heat to the approximate size and shape of the finished article, (b) assembling in a mold the formed core with a sheet of phenolic core stock on each side, a sheet of wood veneer of such thickness as to be substantially dimensionally uncompressed at pressures up to 6000 p.s.i. on the compound curved surface, an outer sheet of a member from the group melamine, melamine related and modified melamine resin, (c) compressing the assembly in said mold under pressure from about 1000 to 6000 p.s.i. and at a temperature between about 240° and 350°, with a parting sheet and a cushion sheet in that order covering the outer sheet, (d) removing the compressed assembly from said mold.

3. The method as claimed in claim 2 wherein the pressure is between about 500 p.s.i. and 2000 p.s.i and the temperature is between about 280° and 330°.

4. The method as claimed in claim 2 wherein the thickness of the wood veneer is in the range of 1/60 inch to 1/120 inch.

References Cited

UNITED STATES PATENTS

| 1,887,691 | 11/1932 | Loetscher | 156—335 |
| 3,055,783 | 9/1962 | Hendrickson et al. | 161—43 |
| 3,283,052 | 11/1966 | Munk | 264—248 |
| 3,415,708 | 12/1968 | Rondum | 161—43 |

OTHER REFERENCES

Plastics, Laminated With Melamine Resins by F. Walter Noble, December 1946, copy 156-196, pp. 46, 48, 49, 94, 95.

SAMUEL W. ENGLE, Primary Examiner

U.S. Cl. X.R.

156—216, 222, 335, 44, 119; 264—248